(12) United States Patent
Gupta et al.

(10) Patent No.: US 8,832,057 B2
(45) Date of Patent: Sep. 9, 2014

(54) RESULTS RETURNED FOR LIST-SEEKING QUERIES

(75) Inventors: Anjani Gupta, Bangalore (IN); Ankur Jain, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 277 days.

(21) Appl. No.: 13/310,658

(22) Filed: Dec. 2, 2011

(65) Prior Publication Data

US 2013/0144870 A1 Jun. 6, 2013

(51) Int. Cl.
*G06F 17/30* (2006.01)

(52) U.S. Cl.
USPC .......................................... 707/706

(58) Field of Classification Search
CPC .......... G06F 17/3053; G06F 17/30613; G06F 17/3064; G06F 17/30693; G06F 17/30699; G06F 17/30864; G06F 17/30867; G06F 17/3087; G06F 17/30893
USPC ......... 707/706, 710, 722, 765, 769, 708, 723, 707/728, 748–749
See application file for complete search history.

(56) References Cited

U.S. PATENT DOCUMENTS

| | | | | |
|---|---|---|---|---|
| 5,926,812 A * | 7/1999 | Hilsenrath et al. | ............ | 707/737 |
| 7,194,483 B1 * | 3/2007 | Mohan et al. | ................. | 707/600 |
| 7,231,388 B2 * | 6/2007 | Matsubayashi et al. | ...... | 707/688 |
| 7,370,034 B2 * | 5/2008 | Franciosa et al. | ............. | 707/749 |
| 7,890,514 B1 * | 2/2011 | Mohan et al. | ................. | 707/748 |
| 8,271,502 B2 * | 9/2012 | Svore et al. | .................... | 707/748 |
| 8,321,398 B2 * | 11/2012 | Aumann et al. | ............. | 707/706 |
| 8,340,955 B2 * | 12/2012 | Brown et al. | ..................... | 704/9 |
| 2002/0198882 A1 * | 12/2002 | Linden et al. | .................. | 707/10 |
| 2008/0320021 A1 * | 12/2008 | Chan et al. | ..................... | 707/101 |
| 2010/0131496 A1 * | 5/2010 | Strehl et al. | ................... | 707/722 |
| 2011/0035403 A1 * | 2/2011 | Ismalon | ........................ | 707/769 |
| 2011/0137921 A1 * | 6/2011 | Inagaki | ........................ | 707/749 |
| 2012/0089622 A1 * | 4/2012 | Fan et al. | ..................... | 707/749 |
| 2012/0117082 A1 * | 5/2012 | Koperda et al. | ............... | 707/748 |
| 2012/0131020 A1 * | 5/2012 | Nitz et al. | ..................... | 707/749 |

* cited by examiner

*Primary Examiner* — Hanh Thai
(74) *Attorney, Agent, or Firm* — Hickman Palermo Truong Becker Bingham Wong LLP (57) ABSTRACT

List-based search results are generated. According to one technique, items are extracted from multiple resources deemed relevant to a user-submitted search query, and a comprehensive master list of those items is compiled and returned to the query-submitted user in response to his submission. According to another technique, lists of items are identified within such query-relevant resources. For each list-containing resource deemed to be relevant to the query terms, a list is extract from that resource and included within that resource's abstract on the search results page returned to the user in response to his submission. Additionally, the resources may be re-ranked for generation of the search results page based on the lists contained within those resources in addition to (or regardless of) occurrences of query terms within those resources.

20 Claims, 3 Drawing Sheets

RESULTS RETURNED FOR LIST-SEEKING QUERIES

FIELD OF THE INVENTION

The present invention generally relates to search engines, and, more specifically, to the generation of lists of items based on information contained in resources indexed for use by a search engine.

BACKGROUND

Today, Internet search engines, such as those provided by Yahoo! Inc., help people to find, on the Internet, resources in which those people are interested. A search engine is usually implemented as a computer program that executes on an Internet-accessible server computer. Typically, a search engine provides a user interface via a web browser (e.g., Mozilla Firefox). A user can enter one or more search terms—usually words—into this user interface and instruct the search engine to search for Internet-available resources, such as Hypertext Markup Language (HTML)-encoded web pages, that are relevant to the search terms. The search engine maintains an index that indicates, for each resource that has been previously discovered by a web-crawling component of the search engine, words that are contained in or otherwise pertinent to that resource. The search engine ranks at least a subset of the indexed resources based in part on the occurrences of the submitted search terms in each resource; resources which contain more instances of the search terms tend to be ranked higher than resources which contain fewer instances of those search terms. The search engine generates a search results page that presents references to the most highly ranked results in rank order, and returns this search results page to the user in response to his request.

Sometimes, however, such a ranked list of references to resources isn't the best way to satisfy the user's information need. For example, if the user entered a query such as "most expensive cars," then many of the most highly ranked resources would probably contain the words "expensive" and "car." However, if the search results page returned in response to that query merely contains references to the web pages that have the most occurrences of the words "expensive" and "car," then the user may be disappointed that the results did not make it immediately clear to him what the actual names of the most expensive cars are. The user is likely to be disappointed even if some of those web pages actually do mention the names of some expensive cars, especially if the names of those cars are not apparent in the search results page due to their absence from the abstracts or summaries shown for each reference. The traditional handling of search requests may often fail to provide the actual information in which the user is truly interested (e.g., actual names of expensive cars).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A technique disclosed herein automatically ranks indexed Internet-accessible resources based on their relevance to user-submitted search terms, and then uses those rankings to extract, from some of the resources, information items that are appropriate for inclusion in a list of items for which a user was probably searching when that user submitted the search terms. A search engine may then present that list of items to the user in response to his search request. For example, in response to a user's query, a search engine may locate, within multiple different web pages, names of items that belong to a category of items that is indicated by the query terms. Therefore, if a user entered search terms such as "top schools for psychology," then the search engine might responsively compile a list of actual names of schools by extracting those names from multiple web pages that the search engine deemed to be relevant to the search terms. Similarly, if a user entered search terms such as "best romantic comedies," then the search engine might responsively compile a list of actual names of romantic comedies by extracting those names from multiple web pages that the search engine deemed to be relevant to the search terms. One particular technique disclosed herein orders items in such an automatically compiled list based at least in part on relevance rankings of the resources from which those items were extracted. This technique may be seen as generating a comprehensive "master list" of items using information gleaned from multiple separate indexed resources.

One particular technique disclosed herein automatically discovers lists contained within at least a most highly ranked subset of the resources deemed relevant to the user-submitted search terms, extracts those lists from the resources that contain them, re-ranks the resources based at least in part on the lists contained therein, and presents the list extracted from each list-containing resource within that resource's abstract or summary on the search results page that the search engine returns to the user in response to the user's search request. Thus, using such a technique, multiple different lists—each from a separate indexed resource—may be presented to the user in the search results page rather than a single comprehensive "master list" as discussed above. Because the re-ranking process gives the lists contained within each resource prominence over search terms contained within that resource, the order in which the lists are presented within the search results page depends more on the lists than the search terms.

Generating Item List-Containing Abstracts for Search Results

Figure 1:
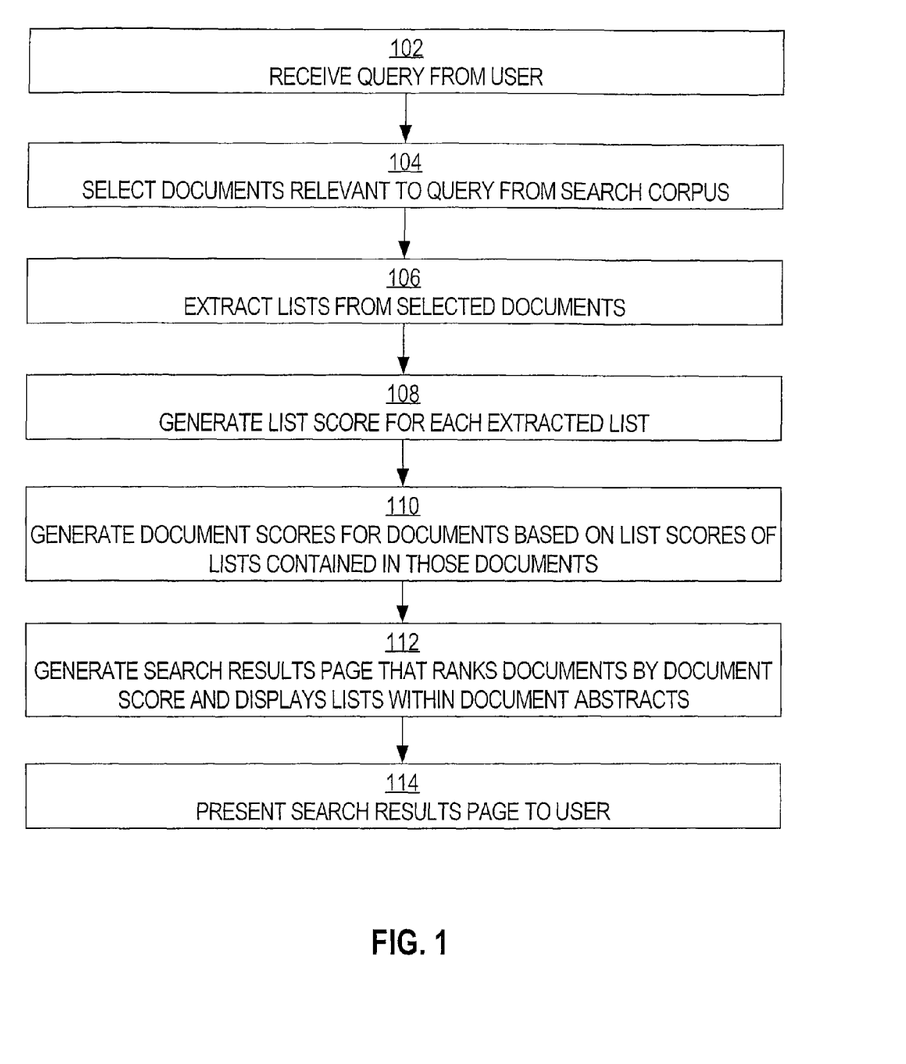
FIG. 1 illustrates a flow diagram for a technique that presents lists of items within abstracts or summaries of resources that a search engine references in a search results page, according to an embodiment of the invention.

FIG. 1 illustrates a flow diagram for a technique that presents lists of items within abstracts or summaries of resources that a search engine references in a search results page, according to an embodiment of the invention. In block 102, a search engine receives a query from a user. The query contains one or more search terms. The search engine may receive the query over the Internet from the user's computer.

In block 104, in response to receiving the query, the search engine selects, from a search corpus, a set of documents that are relevant to the query. The search corpus may contain, for example, web pages and other documents that a web-crawling component previously discovered by following hyperlinks from page to page on the Internet. These web pages and other documents may be indexed in the search corpus based on the words contained within those pages and documents. For example, such an index may indicate, for each word in a dictionary of words, the set of automatically discovered pages and documents that are known to contain that word. Based at least in part on the extent to which pages and documents in the search corpus contain the search terms, the search engine may select a subset of the pages and documents from the corpus. The search engine may initially rank these pages and documents based at least in part on that extent.

In one embodiment, prior to performing the operations of block 106, the search engine additionally filters the set of documents selected in block 104 to remove at least some of the documents from that set. Techniques for performing such filtering are discussed in further detail below.

In block 106, for each document in the set of query-relevant documents selected in block 104, the search engine extracts, from that document, one or more lists that are contained within that document, and inserts those lists into a set of lists. Although in one embodiment of the invention this extraction is performed at query time, in an alternative embodiment of the invention, lists within documents in the search corpus may be identified and extracted earlier—such as, for example, at the time that the web-crawling component of the search engine initially discovers and indexes those documents. As a result of the operations of block 106, the set of lists contains lists extracted from various different ones of the selected query-relevant documents. The set of lists may contain multiple lists from a single document, as well as lists from documents that only contained single lists. Techniques for identifying the presence of lists within documents are discussed further below.

In block 108, for each list in the set of lists populated in block 106, the search engine generates a list score for that list. For each list, the search engine generates that list's list score based at least in part on a number of occurrences of that list's items within other lists in the set of lists. For example, in one embodiment of the invention, if a particular list has a first item that also occurs within three other lists, then the list score for the particular list is incremented by three. Continuing the example, if the particular list has a second item that also occurs within seven other lists, then the list score for the particular list is incremented by seven. There are a variety of different ways in which list scores can be calculated.

In block 110, for each document within the set of query-relevant documents selected in block 104, the search engine generates a document score for that document. For each such document, the search engine generated that document's document score based at least in part on one or more list scores generated (in block 108) for one or more lists that are contained within that document. A document that contains no such lists may be given a document score of zero. In one embodiment, each document's document score is equal to the sum of the list scores of the lists contained within that document. There are a variety of different ways in which document scores can be calculated.

In block 112, the search engine generates a search results page that presents references to at least some of the documents in the set of documents. The search engine orders these references in an order that is based at least in part on the document scores generated for the selected result documents. For example, the search engine may re-rank the documents in the set of documents based on those documents' document scores rather than those documents' relevance (to the search terms) scores, thereby causing a reference to the document with the highest document score to be presented at the top of the search results page, with other documents follow below in order of document score. Although in one embodiment of the invention the documents are re-ranked based on document score alone, in an alternative embodiment of the invention, document score is just one of several weighted factors that are used to re-rank the documents in the final order in which at least some of them will be presented within the search results page. As a result of the operations of block 112, the search results page contains references, such as hypertext links, to the most highly ranked of the re-ranked documents. In generating the search results page, the search engine also stores a copy of the search results page at least temporarily within a computer-readable medium.

In one embodiment of the invention, in generating the search results page, the search engine includes an abstract for each document referenced in the search results page. In one embodiment of the invention, this abstract includes, or substantially is, a list of items extracted from the document to which the abstract pertains (e.g., the list extracted from that document in block 106). In one embodiment of the invention, if a particular document contains more than one list, then the search engine generates that document's abstract to contain only the list that has the highest list score of list scores of lists extracted from that document.

In block 114, the search engine returns the search results page generated in block 112 to the user who submitted the query in block 102. The search engine may send the search results page over the Internet to the user's computer. As a result of the performance of this technique, the user is able to see lists of items that are more likely to satisfy his true interest behind his query submission. Rather than receiving a set of references to documents that merely contain search terms, the user receives a set of references to documents that contain lists of actual names of people, places, and things in which the user is likely to be interested. Because the abstracts for these references contain the lists themselves, extracted from the referenced documents, the user is often able to satisfy his informational need quickly, potentially even without subsequently navigating his browser to any of the referenced documents.

Generating List Scores for Lists

As is discussed above with reference to block 108 of FIG. 1, there are a variety of ways in which the search engine can generate a list score for a particular list extracted from a document. In one embodiment of the invention, the search engine generates a particular list's list score based at least in part on a number of the other lists (in the set of lists populated in block 106) that contain at least one item that is contained in the particular list. For example, in one embodiment of the invention, for each other list in the set of lists that shares at least one list item with the particular list, the particular list's list score is incremented by one. Therefore, in one embodiment of the invention, if exactly seven other lists contained at least one item from the particular list, then the particular list's list score would be seven.

In another embodiment of the invention, the search engine generates a particular list's list score based at least in part on a number of items in the particular list that are also contained in at least one of the other lists (in the set of lists populated in block 106). For example, in one embodiment of the invention, for each item in the particular list that also occurs in another list in the set of lists, the particular list's list score is incremented by one. Therefore, in one embodiment of the invention, if exactly five items contained in the particular list were also contained in one or more other lists in the set of lists, then the particular list's list score would be five.

In another embodiment of the invention, the search engine generates a particular list's list score by generating a separate item score for each item in the particular list, and then adding up the item scores for all items in the particular list to produce the particular list's list score. In one such embodiment of the invention, for each particular item in the particular list, the search engine generates the item score for that particular item by counting the number of times that the particular item occurs within the other lists (in the set of lists populated in block 106). Therefore, if a particular item in the particular list occurred eight times among other lists in the set of lists, then the particular item's item score would be eight. In one embodiment of the invention, each item's item score is influenced by the rank of each occurrence of that item in each list that is determined to be a ranked (e.g., numbered or otherwise enumerated) list. For example, if one of the other lists in which a particular item occurred contained that item at the most highly ranked position, then that particular item's item score might be multiplied by some factor commensurate with the high rank (e.g., the total number of items in the other list divided by the particular item's rank in that other list). If the item scores for the items in the particular list were two, six, five, nine, eight, zero, and one, then the particular list's list score would be 31.

In determining whether two items in different lists should be counted as being the same item, fuzzy matching may be employed to compensate for textual variants (e.g., synonyms) and/or probable misspellings. Thus, in one embodiment of the invention, two lists may be considered to contain the same item even if that item is not exactly identical in each list.

In various different embodiments of the invention, the search engine may use two or more of the techniques described above in conjunction to generate list scores (e.g., by adding or multiplying sums together).

Filtering Query-Relevant Documents Prior to List Extraction

As is discussed above, in one embodiment of the invention, after the search engine has selected a set of documents from the search corpus based on their relevance to the user-submitted query terms (in block 104), but before the search engine extracts lists from documents within the set of selected documents (in block 106), the search engine filters the set of documents, thereby removing one or more documents from the set of documents. There are a variety of ways in which this filtering may be performed.

In one embodiment of the invention, the search engine removes, from the set of documents selected in block 104, all documents on which no list is centrally located. For example, in such an embodiment, if a particular document is determined not to contain any list, then the search engine removes that particular document from the set of documents. For another example, in such an embodiment, if a particular document contains lists that occur only in portions of the particular document that are outside of a central area of the document, then the search engine removes that particular document from the set of documents. The central area of the document may be defined in a variety of different ways. For example, the central area may be defined to be the middle of three vertical areas into which the document is equally divided. For another example, the central area may be defined to be the middle of three horizontal areas into which the document in equally divided. For another example, the central area may be the central rectangular region of a document that has been divided into 9 rectangular regions—three across and three down—of equal size. In alternative embodiments, the regions discussed above need not be of equal sizes; the central area may be defined, for example, as the region occurring in between a top and a bottom margin of some specified size, or in between a left and right margin of some specified size, or in between top, bottom, left, and right margins of some specified size.

In one embodiment of the invention, the search engine removes, from the set of documents selected in block 104, all documents on which no list occupies at least a specified threshold area of the document's total area. For example, in such an embodiment, the search engine may remove, from the set of documents, all documents in which at least 35% of the document's total area is not occupied by a list.

In one embodiment of the invention, the search engine removes, from the set of documents selected in block 104, all documents that do not contain at least one list in which the list items of that list are numbered or ranked relative to other items within that list. For example, in one embodiment, if all of the items within lists within a particular document are not numbered or otherwise enumerated, and if all of those items have no discernible ranking relative to each other, then the search engine removes that particular document from the set of documents.

In one embodiment of the invention, the search engine removes, from the set of documents selected in block 104, all documents that do not contain at least one list in which at least a specified threshold proportion of the items of that list are also main topics in a specified encyclopedia. In one embodiment of the invention, the specified encyclopedia is the well-known, Internet-accessible Wikipedia. In such an embodiment, if at least a specified threshold proportion (or, in one embodiment, absolute quantity) of items in a list are not the top-level subjects of their own Wikipedia articles, then that list will not function to prevent that document that contains that list from being filtered out of the set of documents. For example, in one embodiment, of the invention, for each item in a list, the search engine consults Wikipedia to determine whether an article exists specifically for that item. In such an embodiment, if at least a specified threshold proportion (e.g., 67%) of a particular list's items do not have corresponding Wikipedia articles, then that particular list will not qualify as a list that prevents the document from being filtered out of the set of documents.

In various different embodiments of the invention, the search engine may use two or more of the techniques described above in conjunction to filter documents from the set of documents initially selected in block 104. In one embodiment of the invention, the search engine filters out every document that does not contain at least one list that satisfies all of the criteria of all of the techniques discussed above.

Identifying Lists within Documents

There are a variety of ways in which an automated process, such as a computer program, can identify the presence of and the contents of a list within a document. For example, the process may search for consecutive numbers or letters preceding each textual block (e.g., word, sentence, paragraph, etc.) in a sequence of textual blocks. For another example, the process may search for sets of textual blocks that are spatially organized in a manner such that they appear as separate items that are grouped together, but distinctly from the remainder of the document (e.g., indented or offset similarly to each other but differently from text in the remainder of the document). For another example, the process may search for sets of textual blocks that are demarcated by specified HTML tags (e.g., <DIV>, <TR>, <TD>, etc.). Other techniques for automatically identifying lists within documents are well known.

Generating a Comprehensive Master List from Multiple Documents

As is discussed above, in an alternative embodiment of the invention, instead of generating a search results page that includes a separate list in the abstract of each document, the search engine instead compiles a comprehensive "master list" based on information extracted from multiple separate query-relevant documents, and generates a search results page that contains that master list. As a result, a user can obtain a list of the top, or worst, or most famous, or best (or any other qualifier) entities within a particular selected region. For example, the search engine might compile such a master list in response to a user's query for "best restaurants in San Jose."

Figure 2:
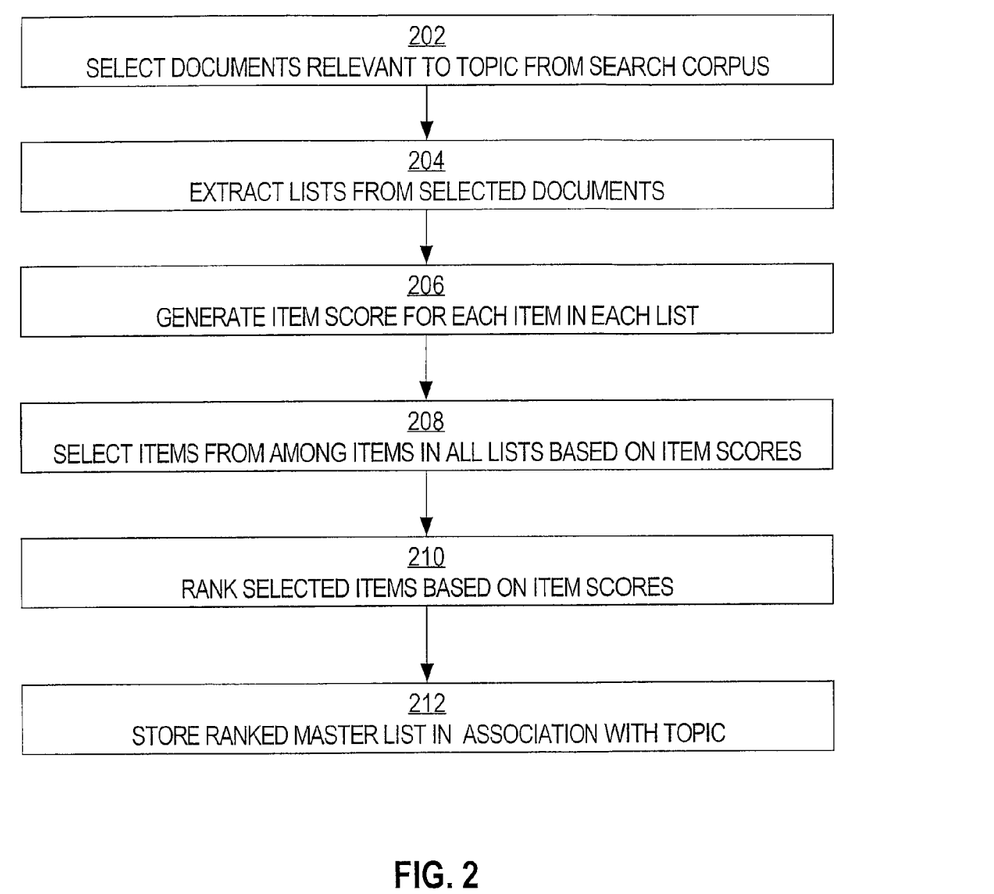
FIG. 2 illustrates a flow diagram for a technique that compiles a master list of items from multiple separate query-relevant documents and presents that master lists of items within a search results page, according to an embodiment of the invention.

FIG. 2 illustrates a flow diagram for a technique that compiles a master list of items from multiple separate query-relevant documents and presents that master lists of items within a search results page, according to an embodiment of the invention. In block 202, a search engine selects, from a search corpus, a set of documents that are relevant to a specified topic. In one embodiment of the invention, the specified topic is a pre-defined query from a set of pre-defined queries. The search corpus may contain, for example, web pages and other documents that a web-crawling component previously discovered by following hyperlinks from page to page on the Internet. These web pages and other documents may be indexed in the search corpus based on the words contained within those pages and documents. For example, such an index may indicate, for each word in a dictionary of words, the set of automatically discovered pages and documents that are known to contain that word. Based at least in part on the extent to which pages and documents in the search corpus contain terms specified by the topic, the search engine may select a subset of the pages and documents from the corpus. In one embodiment of the invention, a stored mapping maps specified topics to specified search terms. In such an embodiment of the invention, based at least in part on the extent to which pages and documents in the search corpus contain search terms that are mapped to the topic by the stored mapping, the search engine may select a subset of the pages and documents from the corpus. The search engine may initially rank these pages and documents based at least in part on that extent.

In one embodiment, prior to performing the operations of block 204, the search engine additionally filters the set of documents selected in block 202 to remove at least some of the documents from that set. Techniques for performing such filtering are discussed above.

In block 204, for each document in the set of topic-relevant documents selected in block 202, the search engine extracts, from that document, one or more lists that are contained within that document, and inserts those lists into a set of lists. As a result of the operations of block 204, the set of lists contains lists extracted from various different ones of the selected topic-relevant documents. The set of lists may contain multiple lists from a single document, as well as lists from documents that only contained single lists. Techniques for identifying the presence of lists within documents are discussed above.

In block 206, for each list in the set of lists, and for each item within that list, the search engine generates an item score for that item. In one embodiment of the invention, the search engine generates each item's item score based at least in part on a number of occurrences of that item within other lists in the set of lists. For example, in such an embodiment of the invention, if a particular item occurs in seven other lists in the set of lists, then the search engine increments that particular item's item score by seven. There are a variety of different ways in which item scores may be calculated.

In one embodiment of the invention, the search engine calculates or adjusts a particular item's item score based at least in part on the ranks of the occurrences of that particular item within other lists in the set of lists. For example, if the particular item occurs at the highest rank in another list, then the particular item's list score may be boosted more significantly than if the particular item occurs at some lower rank in that other list. One possible formula for calculating the item score in this manner involves adding, to the particular item's item score, a quantity that is equal to the total number of items in the other list in which the particular item occurs, divided by the rank of the particular item in that other list.

In one embodiment of the invention, the search engine calculates or adjusts a particular item's item score based at least in part on whether the particular item is ranked higher or lower than a second item in the other list in which both the particular item and the second item occur. This may be seen as a kind of co-ranking, in which item scores for both the particular item and the second item may be adjusted based on their ranks, in other lists, relative to each other. Thus, in one embodiment of the invention, if the particular item is ranked higher than the second item in another list in the set of lists, then the particular item's item score is boosted, while the second item's item score either remains the same or is reduced, but if the second item is ranked higher than the particular item in another list in the set of lists, then the second item's item score is boosted, while the particular item's item score either remains the same or is reduced. Using this technique, items tend to receive scores relative to each other that are reflective of the positions relative to each other within various different lists in the set of lists.

In block 208, the search engine selects a subset of items from among all items in all lists in the set of lists based at least in part on the item scores calculated for those items. For example, in one embodiment of the invention, the search engine selects the items having the top N item scores among items scores for all items in all lists, where N is some specified number (e.g., 10). These selected items are the items that will be included in the master list.

In block 210, the search engine ranks the items (selected in block 208) in the subset of items, relative to each other, based at least in part on the item scores generated for the selected list items, thereby generating a ranked master list for the specified topic. For example, the search engine may sort the selected items in the subset based on their item scores, such that the item having the highest item score is placed at the top of the list with other items following in sequence below based on descending item score.

In block 212, the search engine stores the ranked master list in association with the specified topic. The search engine may persistently store the ranked master list on a non-transitory computer-readable medium for later retrieval and use. At a later time, in response to a user's selection of the topic from a set of specified topics, the search engine may retrieve the master list associated with the topic and present the master list to the user in response to the user's selection of the topic.

Although an embodiment of the invention is described above in which a search engine performs the operations of blocks 202-212, in alternative embodiments of the invention, automated processes other than search engines may perform these operations instead. Such operations may be performed prior to a user's selection of a topic, or in response to a user's selection of a topic.

As a result of the operations of the technique described above, users are able to find comprehensive master lists relating to topics in which those users are interested. Because these master lists are compilations of information gleaned from multiple different documents available on the Internet, the users are spared the task of manually inspecting each document separately in order to locate this information and weigh each document's information against each other document's information.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
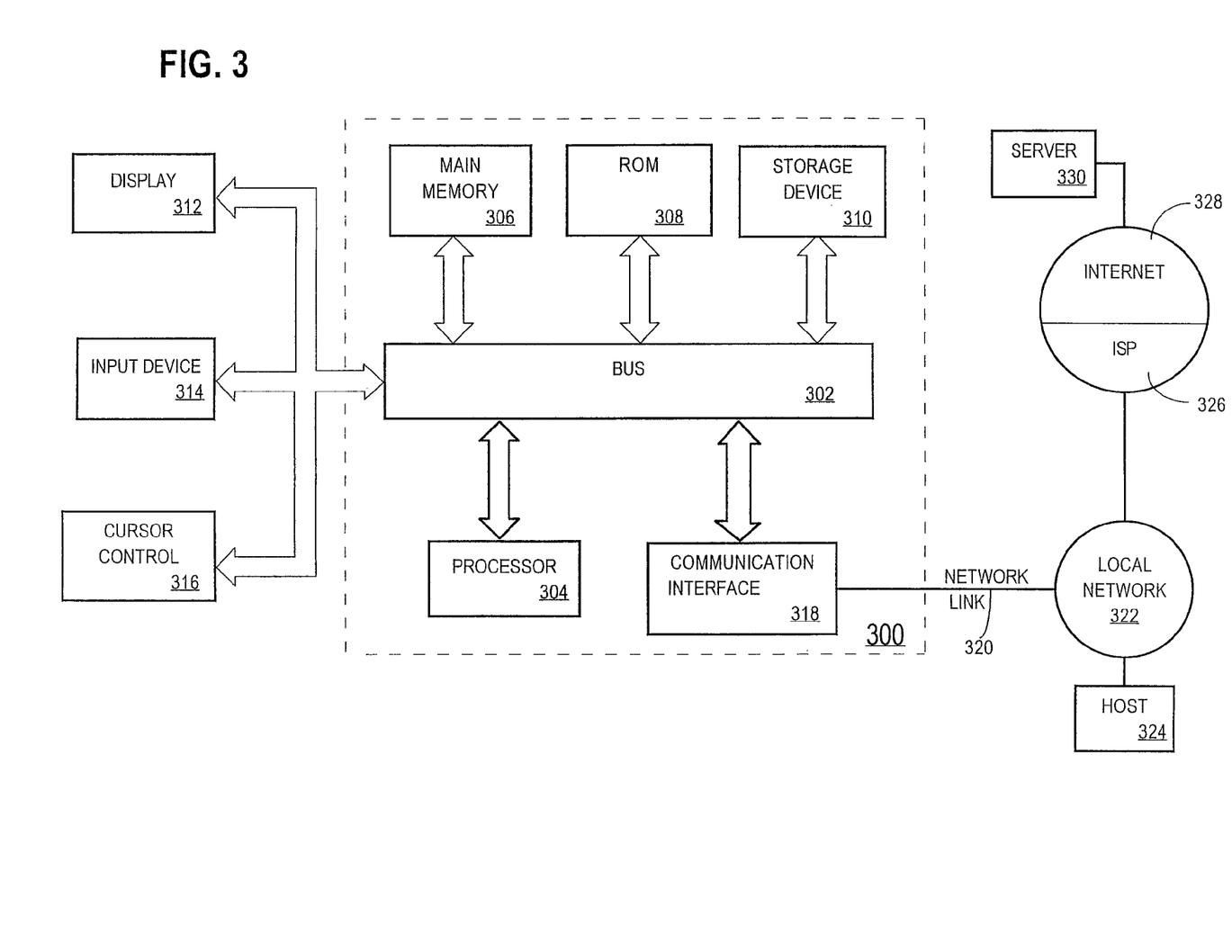
FIG. 3 is a block diagram that illustrates a computer system 300 upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   in response to receiving the query, selecting, from a search corpus, a set of documents that are relevant to the query;
   wherein the set of documents includes at least a first document and a second document;
   for each particular document within at least a subset of the set of documents, extracting one or more lists contained within that particular document and adding the one or more lists into a set of lists;
   wherein extracting one or more lists includes, extracting a first list from the first document and extracting a second list from the second document;
   for each particular list in the set of lists, generating a list score for the particular list based at least in part on a number of occurrences of items in the particular list within other lists in the set of lists;
   wherein generating a list score includes generating a first list score for the first list extracted from the first document, and generating a second list score for the second list extracted from the second document;
   for each particular document within at least the subset of documents, generating a document score for the particular document based at least in part on the list score generated for at least one list contained within the particular document;
   wherein generating a document score includes
      generating a first document score for the first document based, at least in part, on the first list score generated for the first list that was extracted from the first document;
      generating a second document score for the second document based, at least in part, on the second list score generated for the second list that was extracted from the second document; and
   generating a search results page that presents references to selected documents from at least the subset of documents in an order that is based at least in part on the document scores generated for the selected documents;
   wherein the method is performed by one or more computing devices.

2. The method of claim 1, wherein generating the list score for the particular list comprises generating the list score based at least in part on a number of the other lists that contain at least one item that is contained in the particular list.

3. The method of claim 1, wherein generating the list score for the particular list comprises generating the list score based at least in part on a number of the items in the particular list that are also contained in at least one of the other lists.

4. The method of claim 1, wherein generating the list score for the particular list comprises:
   for each particular item in the particular list, generating an item score for that particular item by counting a number of times that the particular item occurs within the other lists; and
   generating the list score for the particular list at least in part by adding together the item scores generated for all items in the particular list.

5. The method of claim 1, further comprising:
   prior to extracting the one or more lists, removing, from the set of documents, all documents on which no list is centrally located.

6. The method of claim 1, further comprising:
   prior to extracting the one or more lists, removing, from the set of documents, all documents for which no list occupies at least a specified threshold proportion of a total document area.

7. The method of claim 1, further comprising:
   prior to extracting the one or more lists, removing, from the set of documents, all documents that do not contain at least one list in which list items are numbered or ranked relative to other list items.

8. The method of claim 1, further comprising:
   prior to extracting the one or more lists, removing, from the set of documents, all documents that do not contain at least one list in which at least a specified threshold proportion of list items are also main topics in a specified encyclopedia.

9. The method of claim 1, wherein the step of generating the document score for the result document based at least in part on the list score generated for at least one list contained within the result document comprises setting the document score equal to a highest list score among list scores of multiple lists contained within the result document.

10. The method of claim 1, wherein the step of generating the search results page that presents references to the selected result documents comprises placing, with each reference to each particular selected result document within the search results page, at least a subset of list items contained within a highest-scoring list extracted from that particular selected result document.

11. A computer-implemented method comprising:

selecting, from a search corpus, a set of documents that are relevant to a specified topic;

wherein the set of documents includes at least a first document and a second document;

for each particular document within at least a subset of the set of documents, extracting one or more lists contained within that particular document and adding the one or more lists into a set of lists;

wherein extracting one or more lists includes, extracting a first list from the first document and extracting a second list from the second document;

for each particular list in the set of lists, and for each particular item within that particular list, generating an item score for that particular item based at least in part on a number of occurrences of that particular item within other lists in the set of lists;

selecting a subset of list items from among all list items in lists in the set of lists based at least in part on the item scores generated for those list items;

wherein selecting the subset of list items includes selecting a first subset of items from the first list and selecting a second subset of items from the second list;

ranking the selected list items in the subset of list items based at least in part on the item scores generated for the selected list items, thereby generating a ranked master list for the specified topic; and storing the ranked master list in association with the specified topic;

wherein the method is performed by one or more computing devices.

12. The method of claim 11, wherein the step of selecting the set of documents that are relevant to the specified topic comprises:

locating, within the search corpus, documents that contain words that are associated with the specified topic.

13. The method of claim 11, wherein the step of generating the item score for the particular item comprises:

adjusting an item score for the particular item based on a rank of an occurrence of that particular item within another list of the set of lists.

14. The method of claim 11, wherein the step of generating the item score for the particular item comprises:

adjusting both (a) an item score for the particular item and (b) an item score for a second item from the same particular list as the particular item in response to a determination that an occurrence of the particular item is either more highly ranked or more lowly ranked than an occurrence of the second item within another list of the set of lists.

15. One or more non-transitory storage media storing instructions which, when executed by one or more computing devices, cause performance of the method recited in claim 1.

16. One or more non-transitory storage media storing instructions which, when executed by one or more computing devices, cause performance of the method recited in claim 4.

17. One or more non-transitory storage media storing instructions which, when executed by one or more computing devices, cause performance of the method recited in claim 10.

18. One or more non-transitory storage media storing instructions which, when executed by one or more computing devices, cause performance of the method recited in claim 11.

19. One or more non-transitory storage media storing instructions which, when executed by one or more computing devices, cause performance of the method recited in claim 13.

20. One or more non-transitory storage media storing instructions which, when executed by one or more computing devices, cause performance of the method recited in claim 14.

* * * * *